(12) United States Patent
Chaudhary et al.

(10) Patent No.: US 10,281,055 B2
(45) Date of Patent: May 7, 2019

(54) HYDRAULIC SERVO VALVE (71) Applicant: Parker-Hannifin Corporation, Cleveland, OH (US)

(72) Inventors: Anuj Chaudhary, Cypress, CA (US); Daniel Christopher Massie, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 171 days.

(21) Appl. No.: 15/421,462

(22) Filed: Feb. 1, 2017

(65) Prior Publication Data
US 2017/0227026 A1   Aug. 10, 2017

Related U.S. Application Data (60) Provisional application No. 62/292,899, filed on Feb. 9, 2016, provisional application No. 62/365,758, filed on Jul. 22, 2016.

(51) Int. Cl.
*F16K 31/00* (2006.01)
*F15B 13/043* (2006.01)

(52) U.S. Cl.
CPC ........ *F16K 31/008* (2013.01); *F15B 13/0433* (2013.01); *F16K 31/007* (2013.01)

(58) Field of Classification Search
CPC .............................. F16K 31/007; F16K 31/008
See application file for complete search history.

(56) References Cited

U.S. PATENT DOCUMENTS

| 2,791,237 | A | * | 5/1957 | Berninger | ............... | F16K 11/24 |
| | | | | | | 137/596.18 |
| 3,152,612 | A | | 10/1964 | Avery | | |
| 3,465,732 | A | | 9/1969 | Kattchee | | |
| 3,524,474 | A | | 8/1970 | McCormick | | |

(Continued)

OTHER PUBLICATIONS

Lindler, et al.; "Piezoelectric Direct Drive Servovalve"; Industrial and Commercial Applications of Smart Structures Technologies, San Diego, CA, Mar. 2000.

(Continued)

*Primary Examiner* — Thomas E Lazo
(74) *Attorney, Agent, or Firm* — Renner, Otto, Boisselle & Sklar, LLP (57) ABSTRACT

A servo valve including a piezo-electric actuator, a flexible linkage, and control valves. The piezo-electric actuator is actuatable along a piezo stack axis. The flexible linkage is coupled to the piezo-electric actuator at opposite axial ends of the actuator. Control valves are disposed at laterally opposite sides of the piezo stack axis and include respective valve stems coupled to the flexible linkage. The flexible linkage may be configured to transfer motion of the piezo-electric actuator along the piezo stack axis to a motion of the valve stems along an amplification axis that is transverse to the piezo stack axis to open and close the control valves. A symmetric actuation element incorporating the piezo-electric actuator, or a different actuator, may have first and second chambers at laterally opposite sides thereof, and be electrically actuatable along an actuation axis to open and close supply and return ports to control fluid communication with respective first and second work ports of respective first and second chambers.

28 Claims, 4 Drawing Sheets (56) References Cited

U.S. PATENT DOCUMENTS

| | | | |
|---|---|---|---|
| 4,492,360 A | 1/1985 | Lee, II et al. | |
| 4,529,164 A * | 7/1985 | Igashira | F02M 59/366 |
| | | | 123/472 |
| 5,148,735 A * | 9/1992 | Veletovac | F15B 13/043 |
| | | | 137/625.64 |
| 6,450,204 B2 * | 9/2002 | Itzhaky | F16K 31/004 |
| | | | 137/883 |
| 6,502,803 B1 * | 1/2003 | Mattes | F02M 47/027 |
| | | | 123/458 |
| 6,799,745 B2 * | 10/2004 | Schmauser | H01L 41/0933 |
| | | | 251/129.06 |
| 7,021,191 B2 * | 4/2006 | Moler | F15B 9/09 |
| | | | 91/393 |
| 7,028,599 B2 * | 4/2006 | Linser | F15B 11/006 |
| | | | 60/422 |
| 7,980,224 B2 * | 7/2011 | Lewis | F02M 47/027 |
| | | | 123/447 |
| 8,567,185 B1 * | 10/2013 | Theobald | B25J 9/144 |
| | | | 60/413 |
| 9,581,263 B2 * | 2/2017 | Reuter | F16K 31/007 |
| 2007/0056439 A1 * | 3/2007 | Vonderwell | E02F 9/22 |
| | | | 91/454 |
| 2007/0075286 A1 * | 4/2007 | Tanner | F16K 11/07 |
| | | | 251/129.06 |
| 2015/0226347 A1 * | 8/2015 | Reuter | F16K 31/007 |
| | | | 251/129.06 |

OTHER PUBLICATIONS

Cedrat Technologies; Amplified Piezoelectric Actuators product information; http://www.cedrat-technologies.com/en/mechatronic-products/actuators/apa.html; printed Aug. 29, 2017.

\* cited by examiner

HYDRAULIC SERVO VALVE

RELATED APPLICATIONS

This application claims the benefit of U.S. Provisional Application No. 62/365,758 filed Jul. 22, 2016, and U.S. Provisional Application No. 62/292,899 filed Feb. 9, 2016, which are hereby incorporated herein by reference.

FIELD OF INVENTION

The present invention relates generally to servo valves, and more particularly to hydraulic servo valves.

BACKGROUND

Hydraulic servo valves can take on a variety of different forms including for example the electro-hydraulic servo type and those that feature multiple chambers, ports, valve lands, etc. The electro-hydraulic servo valve typically includes two or three stages of amplification. A three stage servo valve may have for example a first stage that converts electrical current to motion via a torque motor, a second stage that converts motion to hydraulic pressure via a projector jet and receiver, and a third stage that converts hydraulic pressure to flow via a spool valve. In a two stage servo valve, the hydraulic pressure intermediate stage may be eliminated and a linear motor may directly drive the spool. Electro-hydraulic servo valves may also or alternatively employ a piezo-electric actuator. The actuator may be coupled to a cantilever to increase the range of motion of the actuator. All of these electro-hydraulic servo valves can have various disadvantages relative to certain applications. For example, as every stage of an electro-hydraulic servo valve is physically interconnected, analyzing and designing a multi stage servo valve can be complicated and time consuming. Moreover, manufacturing variations may compromise performance. And servo valves that utilize cantilever mechanisms may in some applications be impractical as they may experience excessive lateral displacement. Existing two stage designs that utilize a linear motor may tend to have lower performance than three stage designs, and so will tend to be larger and heavier for equivalent performance.

Some hydraulic servo valves may be configured to perform flow control, directional control, or pressure control, in which case they may incorporate for example a spool mechanism with various chambers, valve lands, supply and return ports, and work ports to realize particular performance characteristics. A typical application of a directional control valve may be to drive a double acting piston cylinder type actuator. The servo directional control valve can change the direction of hydraulic flow to either the extension side of the piston or the retraction side of the piston to respectively extend or retract the piston within the cylinder. These types of servo valves also suffer from various drawbacks relative to certain applications. For example, the particular configuration of the valve lands may limit the flexibility in control of the overlap and underlap capabilities of the servo valve.

Accordingly, there remains a need for further contributions in this area of technology.

SUMMARY OF INVENTION

The present invention is directed to a piezo-electro hydraulic servo valve that has fewer components, less complexity, and reduced likelihood of manufacturing variations, and a hydraulic servo valve that has improved lap characteristics. According to one aspect of the invention, a servo may include a piezo-electric actuator actuatable along a piezo stack axis; a flexible linkage coupled to the piezo-electric actuator at opposite axial ends of the actuator; and control valves disposed at laterally opposite sides of the piezo stack axis including respective valve stems coupled to the flexible linkage. The flexible linkage may be configured to transfer motion of the piezo-electric actuator along the piezo stack axis to a motion of the valve stems along an amplification axis that is transverse to the piezo stack axis to open and close the control valves.

Embodiments of the invention may include one or more of the following additional features separately or in combination.

The flexible linkage may be symmetric about the piezo stack axis.

The flexible linkage may be configured to transfer motion to the valve stems simultaneously.

The flexible linkage may transfer expansion and contraction motion of the piezo-electric actuator to motion of the valve stems respectively toward and away from the actuator.

The servo valve may further include a strain gauge mounted to the piezo-electric actuator to measure expansion and contraction motion of the piezo-electric actuator and the corresponding movement of the valve stems toward and away from the actuator.

The servo valve may further include a valve housing including piezo-electric actuator sliding supports at opposite axial ends of the piezo-electric actuator to guide movement of the piezo-electric actuator along the piezo stack axis.

The servo valve may further include a valve housing including a valve stem sliding support to guide movement of the valve stems along the amplification axis.

The control valves at laterally opposite sides of the piezo stack axis may include respectively a source chamber and a return chamber. The source chamber may have a supply port and a first work port, and the return chamber may have a return port and a second work port. In response to movement of the valve stems along the amplification axis, the valve stem of the control valve having the source chamber may be configured to permit or block passage of hydraulic fluid from the supply port to the first work port and the valve stem of the control valve having the return chamber may be configured to permit or block passage of hydraulic fluid from the second work port to the return port.

The valve stems may be configured to meter flow through the respective supply port of the source chamber and the return port of the return chamber.

The flexible linkage may transfer motion to the valve stems so that the valve stems meter flow through the supply port and return port at the same time.

The valve stem and supply port and the valve stem and the return port may each form a poppet valve.

The valve stem and supply port and the valve stem and the return port may each form a linear valve.

According to another aspect of the invention, a servo valve may include a first symmetric actuation element; first and second chambers at laterally opposite sides of the first symmetric actuation element, the first chamber having a supply port and a first work port and the second chamber having a return port and a second work port. The first symmetric actuation element may be electrically actuatable along an actuation axis to open and close the supply and return ports to control fluid communication with the respective first and second work ports of the respective first and second chambers.

Embodiments of the invention may include one or more of the following additional features separately or in combination.

The first symmetric actuation element may be configured to open the first chamber supply port and the second chamber return port when activated and close the first chamber supply port and the second chamber return port when deactivated.

The first symmetric actuation element may include a piezo stack encompassed by an external, flexible frame, wherein movement of the piezo stack causes the flexible frame to mechanically deform along opposite sides of the actuation axis and simultaneously open or close the first chamber supply port and the second chamber return port.

The actuation axis of the first symmetric actuation element may be transverse to the axis of deformation of the flexible frame.

The first symmetric actuation element may include an electro-mechanical device having one or more of a motor, solenoid, gear, spring, flapper, spool, linkage, lever, piezo stack or amplification frame, wherein the electro-mechanical device is configured, upon actuation, to cause simultaneous opening and closing of the first chamber supply port and the second chamber return port via either symmetric deformation or via motion along opposite sides of the center of the electro-mechanical device.

The actuation axis of the first symmetric actuation element may be parallel to or coaxial with the axis of deformation or motion of the electro-mechanical device.

The servo valve may further include a second symmetric actuation element; third and fourth chambers at laterally opposite sides of the second symmetric actuation element, the third chamber having a supply port and a third work port and the fourth chamber having a return port and a fourth work port. The second symmetric actuation element may be electrically actuatable along a second actuation axis to open and close the supply and return ports to control fluid communication with the respective third and fourth work ports of the respective third and fourth chambers.

The first symmetric actuation element may be configured to open the first chamber supply port and the second chamber return port when activated and to close the first chamber supply port and the second chamber return port when deactivate. The second symmetric actuation element may be configured to open the third chamber supply port and the fourth chamber return port when activated and to close the third chamber supply port and fourth chamber return port when deactivated.

A control assembly may include the servo valve, and a piston cylinder assembly including a reciprocating piston within a piston chamber having an extension chamber portion at one end of the piston fluidly connected to the first chamber work port and the fourth chamber work port, and a retraction chamber portion at another end of the piston fluidly connected to the third chamber work port and the second chamber work port, wherein when the first symmetric actuation element is activated fluid is directed to the extension chamber portion and away from the retraction chamber portion to extend the piston, and when the second symmetric actuation element is activated fluid is directed to the retraction chamber portion and away from the extension chamber portion to retract the piston.

The control assembly may further include a manifold including flow passages for communicating fluid from the first and fourth chamber work ports to the extension chamber portion and from the third and second chamber ports to the retraction chamber portion.

According to another aspect of the invention, there is provided a method of operating a piston cylinder assembly opening a first hydraulic servo valve to communicate hydraulic fluid to an extension chamber on one side of a piston in the piston cylinder assembly and away from a retraction chamber on an opposite side of the piston cylinder assembly to extend the piston in a first direction; and opening a second hydraulic servo valve to communicate hydraulic fluid to the retraction chamber on the opposite side of the piston in the piston cylinder assembly and away from the extension chamber on the one side of the piston in the piston cylinder assembly to retract the piston in a second direction that is opposite the first direction.

Embodiments of the invention may include one or more of the following additional features separately or in combination.

The first and second hydraulic servo valves may each include a piezo stack encompassed by an external flexible frame.

The first and second hydraulic servo valves may each include an electro-mechanical device having one or more of a motor, solenoid, gear, spring, flapper, spool, linkage, lever, piezo stack or amplification frame.

The first and second hydraulic servo valves may include respectively first and second two-way valves, wherein opening the first two-way valve opens a first extend port to communicate fluid to the extension chamber via a first flow path while opening a first retract port to communicate fluid away from the retraction chamber via a second flow path, wherein opening the second two-way valve opens a second extend port to communicate fluid to the retraction chamber via the second flow path while opening a second retract port to communicate fluid away from the retraction chamber via the first flow path.

The second hydraulic servo valve may be opened before the first hydraulic servo valve is closed to yield an underlap condition.

The method may further include waiting a predetermined amount of delay between closing of the first hydraulic servo valve and opening of the second hydraulic servo valve to yield an overlap condition.

DETAILED DESCRIPTION

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 1:
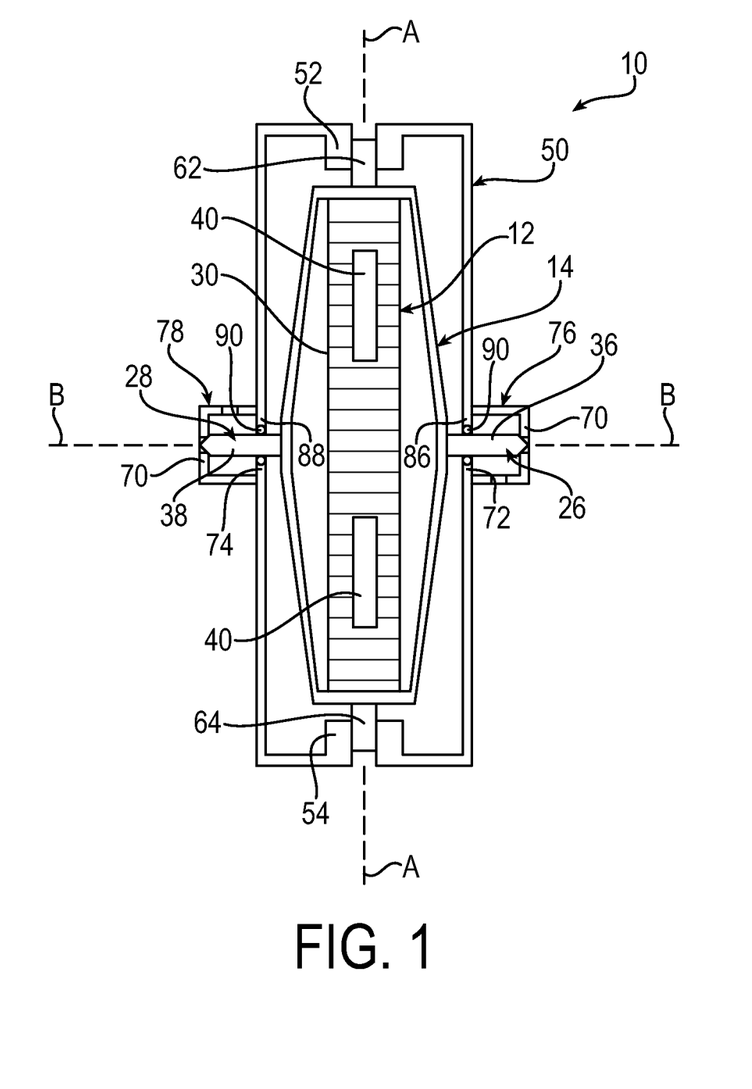
FIG. 1 is a top plan view of an exemplary piezo-electro hydraulic servo valve according to an embodiment, showing the valve in a closed position.
Figure 2:
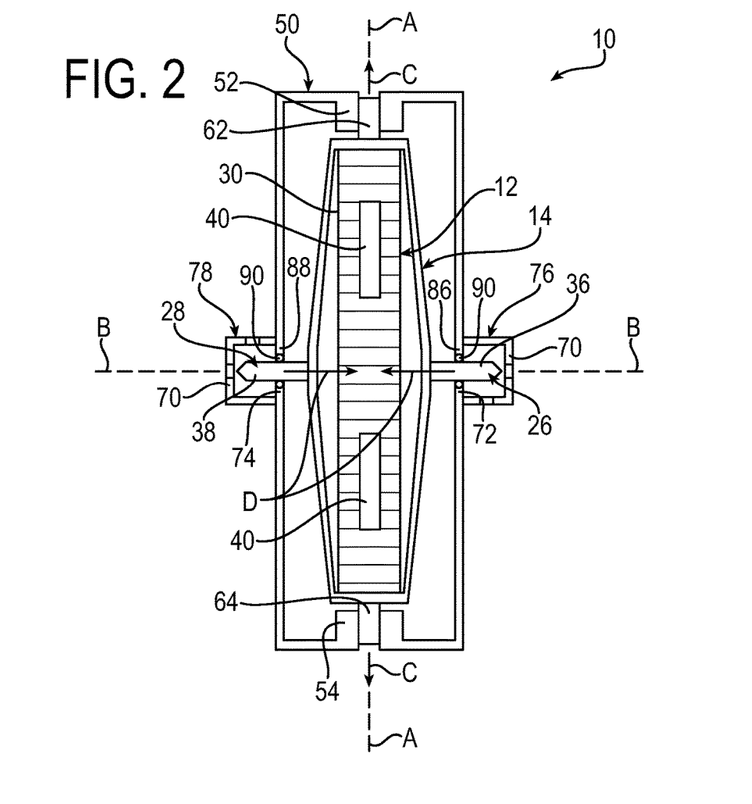
FIG. 2 is a top plan view of the FIG. 1 valve, showing the valve in an open position.

FIGS. 1 and 2 show an exemplary embodiment of a piezo-electro hydraulic servo valve 10. The piezo-electro hydraulic servo valve 10 includes a piezo-electric actuator 12 and a flexible frame or linkage 14 that together form an amplified actuator and cooperate to open and close a pair of control valves 26, 28. The piezo-electric actuator 12 has a piezo stack 30 that expands and contracts along a piezo stack actuation axis A in response to activation and deactivation of the actuator 12. The flexible linkage 14 is coupled to the piezo-electric actuator 12 at opposite axial ends thereof. In the embodiment of FIGS. 1 and 2, the flexible linkage 14 circumscribes the piezo-electric actuator 12. FIG. 1 shows the piezo stack 30 in a contracted position and FIG. 2 shows the piezo stack 30 in an expanded position. The control valves 26, 28 are disposed at laterally opposite sides of the piezo stack axis A, and include respective valve stems 36, 38 coupled to the flexible linkage 14. The flexible linkage 14 operates as an amplification frame to amplify relatively smaller displacements in the piezo stack 30 along the piezo stack axis A into relatively larger displacements in the valve stems 36, 38 along an amplification axis B that is transverse to the piezo stack axis A. As will be described in greater detail below, the flexible linkage 14 transfers motion of the piezo-electric actuator 12 along the piezo stack axis A into motion of the valve stems 36, 38 along the amplification axis B to open and close the control valves 26, 28. In one exemplary application, the control valves 26, 28 can be integrated into a control assembly to control for example a hydraulic double acting piston cylinder or the like, as is also described in greater detail below.

In the illustrative embodiment of FIGS. 1 and 2, the flexible linkage 14 is symmetric about the piezo stack axis A and embodies a generally elliptical configuration in which the axis A is the major axis and the axis B is the minor axis. The piezo-electro actuator 12 thus incorporates a symmetric two-way valve structure that enables the control valves 26, 28 to move together on opposite sides of the actuator 12. Owing to such symmetry, activation of the piezo stack 30 results in a displacement of the valve stem 36 along the amplification axis B being the same as a displacement of the valve stem 38 along the amplification axis B. Further, the flexible linkage 14 is coupled to the valve stems 36, 38 for example by bonding or welding or fastening to transfer motion to the valve stems 36, 38 simultaneously. As will be appreciated, the flexible linkage 14 is not limited to the particular configuration shown in FIGS. 1 and 2, and other embodiments are contemplated. For example, the flexible linkage 14 may be asymmetric about the piezo stack axis A so that the resulting amplified displacement of the valve stem 36 along the amplification axis B is different from the amplified displacement of valve stem 38 along the amplification axis B. Further, in an embodiment the flexible linkage 14 may be coupled to the valve stems 36, 38 to yield a non-simultaneous motion between the valve stems 36, 38. For example, a clearance or neutral zone may be provided between the flexible linkage 14 and one of the valve stems 36, 38 so that motion transferred from the flexible linkage 14 to one valve stem 36, 38 is delayed relative to motion transferred to the other valve stem 36, 38.

Continuing to refer to FIGS. 1 and 2, the flexible linkage 14 may include any suitable amplification frame that amplifies the A axis motion of the piezo stack 30 to B axis motion in the valve stems 36, 38. In the illustrative embodiment, the piezo stack 30 is encompassed by the flexible linkage 14 and causes the flexible linkage 14 to mechanically deform along opposite sides of the piezo stack axis A. As a result, the flexible linkage 14 transfers expansion and contraction motion of the piezo-electric actuator 12 to the valve stems 36, 38 such that motion of the valve stems 36, 38 is respectively toward and away from the actuator 12. In the illustrated embodiment, the B axis is perpendicular to the A axis and, accordingly, motion of the valve stems 36, 38 is perpendicular to the motion of the piezo stack 30. The axes A, B need not be oriented perpendicular to one another, and other embodiments are contemplated. For example, the flexible linkage 14 may be configured to have a geometry that converts axis A motion into axis B motion that is non-perpendicular to the axis A motion.

In FIG. 1, the piezo stack 30 is in a contracted state and in FIG. 2, as represented by the arrows C, the piezo stack 30 is in an expanded state. In the illustrated embodiment, deactivation of the piezo-electric actuator 12 yields the FIG. 1 contracted state and activation of the actuator 12 yields the FIG. 2 expanded state. The valve stems 36, 38 are shown moved away from the piezo stack 30 in FIG. 1, and shown moved toward the piezo stack 30 in FIG. 2, as represented by the arrows D. It will be appreciated that the piezo-electro hydraulic servo valve 10 need not be limited to the expansion and contraction scheme illustrated in FIGS. 1 and 2, and other embodiments are contemplated. For example, the flexible linkage 14 may be configured to transfer expansion and contraction motion of the piezo-electric actuator 12 to the valve stems 36, 38 such that motion of the valve stems 36, 38 is respectively away from and toward the actuator 12. Further, the piezo-electric actuator 12 may be configured such that activation of the actuator 12 yields the FIG. 1 contracted state and deactivation of the actuator 12 yields the FIG. 2 expanded state. In a further embodiment, there may be multiple levels of activation that move the valve stems 36, 38 respectively away from and toward the actuator 12, for example, a first activation level may yield a first expanded piezo stack 30 state and a second activation level may yield a second expanded piezo stack 30 state. In an embodiment, the flexible linkage 14 may exert a pre-load on the piezo stack 30, either in tension or compression, as will be appreciated.

The piezo-electro hydraulic servo valve 10 includes one or more strain gauges 40 mounted to the piezo-electric actuator 12. The strain gauges 40 measure expansion and contraction motion of the piezo-electric actuator 12 for feedback, monitoring, and redundancy. For example, the strain gauges 40 can measure expansion and contraction motion of the piezo-electric actuator 12 to determine by association the corresponding movement of the valve stems 36, 38 toward and away from the actuator 12. The strain gauges 40 can be used to ensure proper linear displacement response of the piezo-electric actuator 12 and, as described in greater detail below, to compensate for hysteresis. In the embodiment of FIGS. 1 and 2, the strain gauges 40 are shown mounted to an upper portion of the piezo stack 30. Other embodiments are contemplated. For example, a strain gauge 40 may be mounted in any location where there occurs a change in displacement of the piezo stack 30, the flexible linkage 14, the valve stems 36, 38, or other components of the piezo-electro hydraulic servo valve 10.

A valve housing 50 may be provided to guide and/or the support piezo-electric actuator 12. In the illustrated embodiment, the valve housing 50 includes piezo-electric actuator sliding supports 52, 54 at opposite axial ends of the piezo-electric actuator 12. The sliding supports 52, 54 slidably receive distal ends 62, 64 of the piezo-electric actuator 12 to guide movement of the piezo-electric actuator 12 along the piezo stack axis A. As shown in FIGS. 1 and 2, the distal ends 62, 64 of the actuator 12 may take the form of pins while the sliding supports 52, 54 may take the form of bores or bushings or linear bearings within which the pins axially slide.

The control valves 26, 28 each include a valve stem sliding support 72, 74 to guide movement of the valve stems 36, 38 along the amplification axis B. The valve stem sliding supports 72, 74 may be provided in a wall that forms part of the valve housing 50, or in a wall that forms part of a control valve housing 76, 78 of the control valve 26, 28, or in a wall 86, 88 that constitutes a common wall for the valve housing 50 and the control valve housing 76, 78 as shown in FIGS. 1 and 2. The valve stem sliding supports 72, 74 may include a hydraulic sliding seal 90 to seal the valve stems 36, 38 to prevent hydraulic fluid from entering the valve housing 50. Such hydraulic sliding seal 90 may take the form of, for example, a glandless type seal, a dynamic seal in which the seal is provided on the valve stem, a static seal in which the seal is fixed in the valve bore, or any other suitable sealing technique that prevents hydraulic fluid from entering the valve housing 50.

Figure 3:
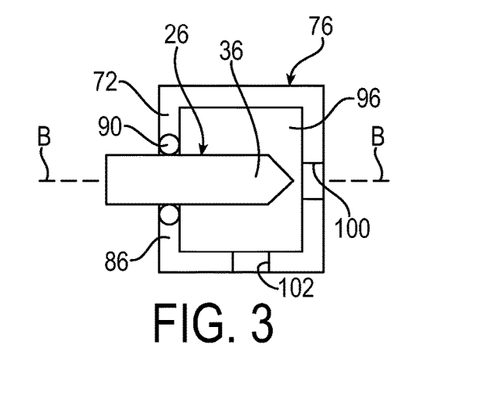
FIG. 3 is an enlarged view of a right side control valve of the FIG. 1 piezo-electro hydraulic servo valve.
Figure 4:
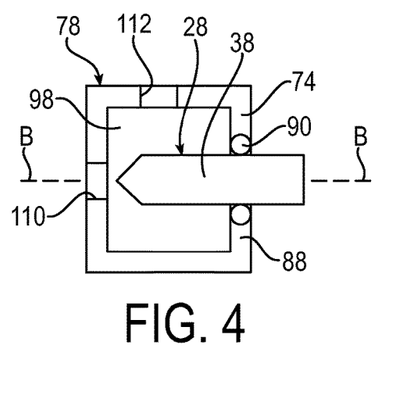
FIG. 4 is an enlarged view of a left side control valve of the FIG. 1 piezo-electro hydraulic servo valve.

The control valves 26, 28 respectively form a source chamber 96 and a return chamber 98 of the piezo-electo hydraulic servo valve 10, which are shown in enlarged view respectively in FIGS. 3 and 4. The source chamber 96 has a supply port 100 and a first work port 102, best shown in FIG. 3, and the return chamber 98 has a return port 110 and a second work port 112, best shown in FIG. 4. As described in greater detail below, the first and second work ports 102, 112 may act as extend and retract ports in a control assembly for controlling a hydraulic double acting piston cylinder, for example.

Referring to FIG. 3, when the flexible linkage 14 moves the valve stem 36 along the amplification axis B toward the piezo stack axis A (to the left in FIG. 3), the valve stem 36 opens the supply port 100 to permit passage of hydraulic fluid from the supply port 100 to the first work port 102. When the flexible linkage 14 moves the valve stem 36 away from the piezo stack axis A (to the right in FIG. 3), the valve stem 36 blocks the supply port 100 and thus prevents passage of hydraulic fluid from the supply port 100 to the first work port 102. Referring to FIG. 4, in a similar manner, when the flexible linkage 14 moves the valve stem 38 along the amplification axis B toward the piezo stack axis A (to the right in FIG. 4), the valve stem 38 opens the return port 110 and thus permits passage of hydraulic fluid from the second work port 112 to the return port 110. When the flexible linkage 14 moves the valve stem 38 away from the piezo stack axis A (to the left in FIG. 4), the valve stem 38 blocks the return port 110 and thus prevents passage of hydraulic fluid from the second work port 112 to the return port 110.

In the illustrated embodiment, the valve stems 36, 38 are configured to meter flow through the respective supply port 100 of the source chamber 96 and the return port 110 of the return chamber 98. Further, owing to the afore described symmetrical construction of the flexible linkage 14 on opposite sides of the piezo stack axis A, the flexible linkage 14 transfers motion to the valve stems 36, 38 so that the valve stems 36, 38 meter flow through the supply port 100 and the return port 110 in the same amount and at the same time. It will be appreciated that other arrangements may be suitable. For example, the valve stem 36 may be configured to meter flow through the first work port 102 rather than the supply port 100, and the valve stem 38 may be configured to meter flow through the second work port 112 rather than the return port 110. Further, metering the flow need not be at the same time for the respective valve stems 36, 38. For example, the valve stem 38 may be configured to close the return port 110, and thus cease metering flow through the return port 110, prior to the valve stem 36 closing the supply port 100. Still further, in an embodiment, the amount of metering of flow may differ on opposite sides of the piezo stack axis A, for example by way of an asymmetric flexible linkage as described above, or by way of a different geometric construction in the valve stem 36 and supply port 100 interface from the geometric construction in the valve stem 38 and return port 110 interface.

Referring again to FIGS. 3 and 4, the control valves 26, 28 are configured as conical type poppet valves. Thus, in FIG. 3 the valve stem 36 and supply port 100 form a conical poppet valve and, in FIG. 4, the valve stem 38 and the return port 110 form a conical poppet valve. The conical poppet valves enable flow rate versus linear position characteristics to be modified. Flow rate may be modified, for example, by changes to the size and configuration of the valve stems 36, 38, as well as changes to the size and configuration of the supply port 100 and the return port 110 and the respective orifice areas associated with the valve stems 36, 38 and supply and return ports 100, 110.

Figure 5:
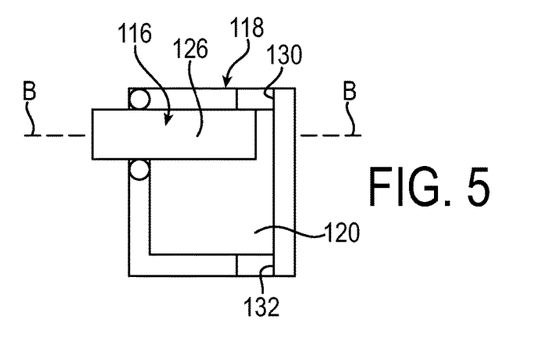
FIG. 5 shows an embodiment of another control valve suitable for the FIG. 1 piezo-electro hydraulic servo valve.

Of course, the control valves 26, 28 need not be limited to poppet type valves, and other embodiments are contemplated. For example, as shown in FIG. 5, a linear type control valve 116 having a spool-type sliding orifice may also be suitable. The FIG. 5 control valve 116 includes a housing 118, a source chamber 120, a valve stem 126, a supply port 130, and a first work port 132. When the flexible linkage 14 moves the valve stem 126 along the amplification axis B toward the piezo stack axis A (to the left in FIG. 5), the valve stem 126 opens the supply port 130 to permit passage of hydraulic fluid from the supply port 130 to the first work port 132. The control valve 28 for the return chamber 98 may be structured in an analogous manner.

In the FIG. 5 control valve 116, hydraulic flow forces experienced by the flexible linkage 14 and accordingly the piezo stack 30 may be relatively lower than those experienced with for example the poppet type valve, as hydraulic fluid flows past the valve stem 126 rather into the valve stem 126 along the axis of the valve stem 126. The linear control valve 116 can be used to place the first work port 132 across from the supply port 130, as shown in FIG. 5, which may reduce flow losses within the chamber 120. The control valves 26, 28 may take on a poppet type valve construction as shown in FIGS. 3 and 4, a spool-type sliding orifice type construction as shown in FIG. 5, or any other suitable construction, it being understood that control valve types and construction, manufacturing techniques and tolerances as well as costs may favor one type or construction of valve over another, or favor still other types or constructions of valves, as will be appreciated by those skilled in the art.

Figure 6:
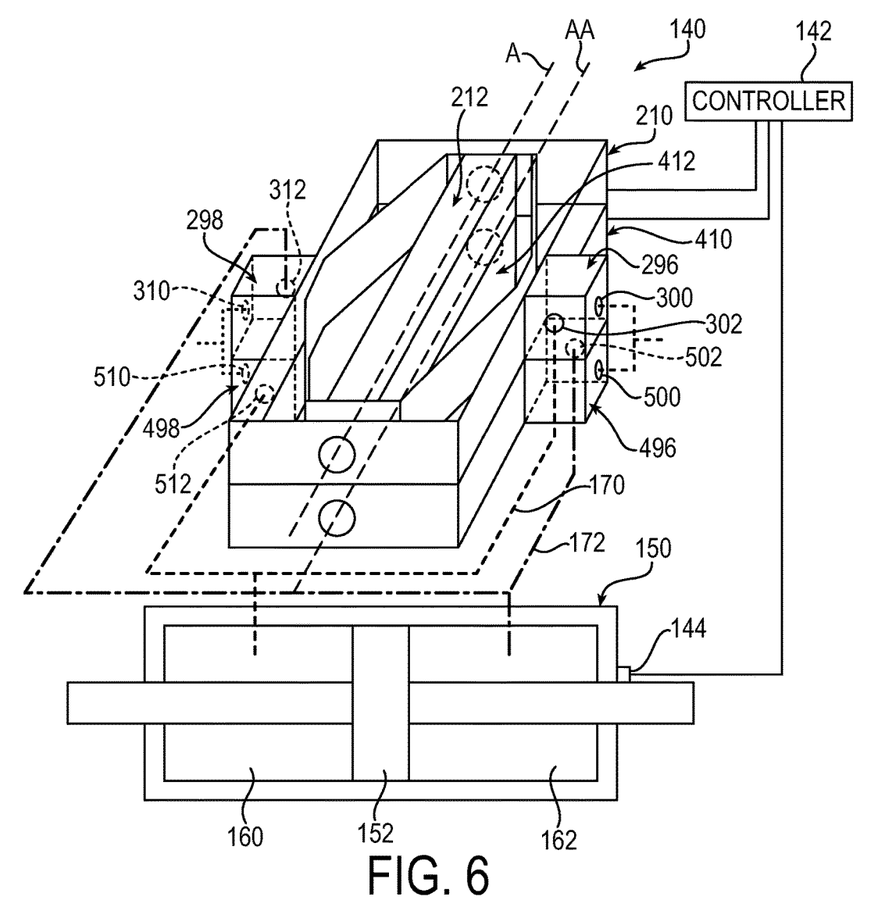
FIG. 6 is a perspective view of a control assembly according to an embodiment.

Referring now to FIG. 6, there is shown an exemplary embodiment of a control assembly 140 for controlling a double acting piston cylinder. The control assembly 140 includes a controller 142, first and second, or upper and lower, piezo-electro hydraulic servo valves 210, 410 and a piston cylinder assembly 150. The piezo-electro hydraulic servo valves 210, 410 of the FIG. 6 assembly 140 are in many respects substantially the same as the above-referenced piezo-electro hydraulic servo valve 10 of FIGS. 1 and 2, and consequently the same reference numerals but indexed by 200 or 400 are used to denote structures corresponding to similar structures in the valve 10 of FIGS. 1 and 2. In addition, the foregoing description of the piezo-electro hydraulic servo valve 10 of FIGS. 1 and 2 is equally applicable to the FIG. 6 control assembly 140 and piezo-electro hydraulic servo valves 210, 410, except as may be noted herein. Moreover, it will be appreciated upon reading and understanding the specification that aspects of the piezo-electro hydraulic servo valves 10, 210, 410 may be substituted for one another or used in conjunction with one another where applicable.

The first, or upper, piezo-electro hydraulic servo valve 210 includes a first piezo-electric actuator 212, and first and second chambers 296, 298 at laterally opposite sides of the first piezo-electric actuator 212. The first chamber 296 has a supply port 300 and a first work port 302 and the second chamber 298 has a return port 310 and a second work port 312. The first piezo-electric actuator 212 is electrically actuatable along an actuation axis A to open and close the supply and return ports 300, 310 to control fluid communication with the respective first and second work ports 302, 312 of the respective first and second chambers 296, 298. The second, or lower, piezo-electro hydraulic servo valve 410 includes a second piezo-electric actuator 412, and third and fourth chambers 496, 498 at laterally opposite sides of the second piezo-electric actuator 412. The third chamber 496 has a supply port 500 and a third work port 502 and the fourth chamber 498 has a return port 510 and a fourth work port 512. The second piezo-electric actuator 412 is electrically actuatable along a second actuation axis AA to open and close the supply and return ports 500, 510 to control fluid communication with the respective third and fourth work ports 502, 512 of the respective third and fourth chambers 496, 498.

The first actuator 212 is configured, upon actuation, to cause simultaneous opening and closing of the supply port 300 of the first chamber 296 and the return port 310 of the second chamber 298. As with the piezo-electro actuator 12, the manner of actuation may be by symmetric deformation on opposite sides of the center of the first actuator 212. The second actuator 412 is configured, upon actuation, to cause simultaneous opening and closing of the supply port 500 of the third chamber 496 and the return port 510 of the fourth chamber 498. Likewise, the manner of actuation may be by symmetric deformation on opposite sides of the center of the second actuator 412. The first and second actuators 212, 412 each incorporate a symmetric two-way valve structure that enables the control valves (see FIGS. 1 and 2, control valves 26, 28) of each two-way valve 212, 412 to move together on opposite sides of the actuator 212, 412. Thus, for example, activation of the actuator 212 (or actuator 412), results in a displacement of the valve stem 36 (see FIGS. 1 and 2) on one side of the actuator 212 being the same as a displacement of the valve stem 38 (see FIGS. 1 and 2) on the other side of the actuator 212. As will be described in greater detail with the FIG. 7 embodiment, those skilled in the art will appreciate that numerous types of actuating mechanisms can realize the opening and closing of the supply port 300 and return port 310, or the supply port 500 or return port 510, for example, as by urging movement of the valve stems 36, 38 (see FIGS. 1 and 2) of the servo valves 210, 410.

Of course, as with the piezo-electro actuator 12, the first and second actuators 212, 412 can be configured for other than symmetric actuation on opposite sides of the actuators 212, 412, or other than simultaneous opening and closing of the hydraulic servo valves 210, 410. For example, the actuator 212 (or actuator 412) may incorporate an asymmetric two-way valve structure such that the resulting displacement of the valve stem 36 is different from the displacement of valve stem 38. Further, in an embodiment the actuator 212 (or actuator 412) may be coupled to the valve stems 36, 38 to yield a non-simultaneous motion between the valve stems 36, 38. For example, a clearance or neutral zone may be provided between the actuator 212 and one of the valve stems 36, 38 so that motion transferred from the actuator 212 to one valve stem 36, 38 is delayed relative to motion transferred to the other valve stem 36, 38.

The controller 142 is configured to activate and deactivate the first and second piezo-electric actuators 212, 412. The term "controller" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

When the controller 142 activates the first piezo-electric actuator 212, the first piezo-electric actuator 212 opens the supply port 300 of the first chamber 296 and the return port 310 of the second chamber 298. When the controller 142 deactivates the first piezo-electric actuator 212, the first piezo-electric actuator 212 closes the supply port 300 of the first chamber 296 and the return port 310 of the second chamber 298. When the controller 142 activates the second piezo-electric actuator 412, the second piezo-electric actuator 412 opens the supply port 500 of the third chamber 496 and the return port 510 of the fourth chamber 498. When the controller 142 deactivates the second piezo-electric actuator 412, the second piezo-electric actuator 412 closes the supply port 500 of the third chamber 496 and the return port 510 of the fourth chamber 498.

The piston cylinder assembly 150 includes a reciprocating piston 152 within a piston chamber 154 having an extension chamber 160 at one end of the piston 152 and a retraction chamber 162 at the other end of the piston 152. The extension chamber 160 is fluidly connected via a suitable flow passage 170 to the work port 302 of the first chamber 296 and the work port 512 of the fourth chamber 498. The retraction chamber 162 is fluidly connected via a suitable flow passage 172 to the work port 502 of the third chamber 496 and the work port 312 of the second chamber 298. As will be appreciated, the first and second work ports 302, 312 can operate as respective extend and retract ports 302, 312 for the first, or upper, piezo-electro hydraulic servo valve 210, and the first and second work ports 502, 512 can operate as respective retract and extend ports 502, 512 for the second, or lower, piezo-electro hydraulic servo valve 410.

In the FIG. 6 embodiment, the controller 142 may actuate the first and second piezo-electro hydraulic servo valves 210, 410 to extend the piston 152 (to the right in FIG. 6) or retract the piston 152 (to the left in FIG. 6). To extend the piston 152, the controller 142 activates the first piezo-electric actuator 212 to open the control valves of the first and second chambers 296, 298 at opposite sides of the piezo stack axis A, for example, in the manner described above with respect to the embodiment of FIGS. 1 and 2. With the control valve to the right in FIG. 6 open, the first chamber 296 communicates hydraulic fluid from the supply port 300 to the work port 302. The flow passage 170, in turn, communicates the hydraulic fluid from the work port 302 to the extension chamber 160 of the piston cylinder assembly 150. The hydraulic fluid in the extension chamber 160 increases the force exerted on the left side of the piston 152 to thereby extend the piston 152 toward the right in FIG. 6. Meanwhile, with the control valve to the left in FIG. 6 open, the flow passage 172 communicates hydraulic fluid away from the retraction chamber 162 of the piston cylinder assembly 150 to the work port 312 of the second chamber 298, which, in turn, communicates the hydraulic fluid from the work port 312 to the return port 310. The hydraulic fluid in the retraction chamber 162 lowers the force exerted on the right side of the piston 152, which aids extension of the piston 152 to the right in FIG. 6 by the hydraulic fluid in the extension chamber 160. The work port 310, in turn, communicates the hydraulic fluid from the second chamber 298 to a supply reservoir or the like. During the foregoing operation of extending the piston 152 from left to right in FIG. 6, the controller 142 may activate or deactivate the second piezo-electro hydraulic servo valve 410, so long as the force exerted on the right side of the piston 152 is relatively lower than the force exerted on the left side of the piston 152 to urge the piston 152 from left to right.

To retract the piston 152, the controller 142 activates the second, or lower, piezo-electric actuator 412 to open the control valves of the third and fourth chambers 496, 498 at opposite sides of the piezo stack axis AA, for example, in the manner described above with respect to the embodiment of FIGS. 1 and 2. With the control valve to the right in FIG. 6 open, the third chamber 496 communicates hydraulic fluid from the supply port 500 to the work port 502. The flow passage 172, in turn, communicates the hydraulic fluid from the work port 502 to the retraction chamber 162 of the piston cylinder assembly 150. The hydraulic fluid in the retraction chamber 162 increases the force exerted on the right side of the piston 152 to thereby retract the piston 152 toward the left in FIG. 6. Meanwhile, with the control valve to the left in FIG. 6 open, the flow passage 170 communicates hydraulic fluid away from the extension chamber 160 of the piston cylinder assembly 150 to the work port 512 of the fourth chamber 498, which, in turn, communicates the hydraulic fluid from the work port 512 to the return port 510. The hydraulic fluid in the extension chamber 160 lowers the force exerted on the left side of the piston 152, which aids retraction of the piston 152 to the left in FIG. 6 by the hydraulic fluid in the extension chamber 162. The work port 510, in turn, communicates the hydraulic fluid from the fourth chamber 498 to a supply reservoir or the like. During the foregoing operation of retracting the piston 152 from right to left in FIG. 6, the controller 142 may activate or deactivate the first piezo-electro hydraulic servo valve 210, so long as the force exerted on the left side of the piston 152 is relatively lower than the force exerted on the right side of the piston 152 to urge the piston from right to left.

In the FIG. 6 embodiment, when the control assembly 140 opens the piezo-electro hydraulic servo valve 210 the pressure of the hydraulic fluid communicated from the supply port 300 of the first chamber 296 to the extension chamber 160 is relatively higher than the pressure of the hydraulic fluid communicated from the retraction chamber 162 to the return port 310 of the return chamber 298. Similarly, when the control assembly 140 opens the piezo-electro hydraulic servo valve 410 the pressure of the hydraulic fluid communicated from the supply port 500 of the first chamber 496 to the retraction chamber 162 is relatively higher than the pressure of the hydraulic fluid communicated from the extension chamber 160 to the return port 510 of the return chamber 498. Thus, the return ports 310, 510 of the return chambers 298, 498 operate as low pressure drains. As is also shown in FIG. 6, the supply ports 300, 500 branch from a common supply line, and the return ports 310, 510 feed into a common drain line. Further, in the FIG. 6 embodiment, the opposite sides of the piston 152 have the same effective working area.

As will be appreciated, the control assembly 140 need not be limited to the configuration shown in FIG. 6. For instance, the effective working areas may be different on opposite sides of the piston 152, and the hydraulic pressure at the supply ports 300, 500 may be relatively lower than the hydraulic pressure at the respective return ports 310, 510. Further, the supply ports 300, 500 need not share a common supply and can be configured to operate at hydraulic pressures independent of one another. Likewise, the return ports 310, 510 need not share a common drain and can be configured to operate at hydraulic pressures independent of one another. The controller 142 can be configured to control the piezo-electro hydraulic servo valves 210, 410 in conjunction with control of hydraulic pressure. Thus, the controller 142 can be configured to control the piezo-electro hydraulic servo valve 210 separately and independently of the piezo-electro hydraulic servo valve 410, for example, with respect to adjusting the orifice areas at the supply ports 300, 500 and return ports 310, 510, and the rate at which the orifice areas are adjusted. The controller 142 can also be configured to selectively increase and decrease the hydraulic pressure from the supply port 300 to the extension chamber 160 and from the retraction chamber 162 to the return port 310 and, independently thereof, selectively increase and decrease the hydraulic pressure from the supply port 500 to the retraction chamber 162 and from the extension chamber 160 to the return port 510. In some applications, the piston 152 may be spring loaded to bias the piston 152 toward either the extension side or the retraction side. In some applications, the control assembly 140 may incorporate a single acting spring loaded piston type actuating cylinder rather than the as-shown double acting piston cylinder. In still other applications, a two-way valve (rather than the as shown four-way valve of FIG. 6) can be used in such single acting spring loaded piston type actuating cylinder. Of course, it will be appreciated that a two-way valve can be used to drive a variety of loads including a hydraulic pump, a single acting piston, among others. In the FIG. 6 embodiment, or any other piston driven application, the controller 142 can also receive a piston position measurement or other data, for example via a suitable sensor 144 such as an LVDT, and use such information to control one or more of the piezo-electro hydraulic servo valves.

It will further be appreciated that a single piezo-electro hydraulic servo valve 210 can be used as a gate valve to operate the double acting piston cylinder assembly 150 in FIG. 6. For example, the lower piezo-electro hydraulic servo valve 410 can be omitted and the upper piezo-electro hydraulic servo valve 210 can have its supply port 300 connected to a first hydraulic pressure controller and its return port 310 connected to a separate second hydraulic pressure controller. The first work port 302 can communicate hydraulic fluid to and from the extension chamber 160 via the flow passage 170 and the second work port 312 can communicate hydraulic fluid to and from the retraction chamber 162 via the flow passage 172. The portions of the flow passages 170, 172 routed to the lower piezo-electro hydraulic servo valve 410 can be omitted. In operation, the pressure controllers generate relatively higher pressure on the left side (or right side) to effect a pressure drop across the piezo-electro hydraulic servo valve 210. To extend the piston 152, the pressure controllers create a relatively higher pressure on the right side, that is, at the first chamber 296. The piezo-electro hydraulic servo valve 210 can then be opened to allow flow of hydraulic fluid through the flow passage 170 to the extension chamber 160 to thereby extend the piston 152. The piezo-electro hydraulic servo valve 210 can then be closed. To retract the piston 152, the pressure controllers create relatively higher pressure on the left side, that is, at the second chamber 298. The piezo-electro hydraulic servo valve 210 can then be opened to allow flow of hydraulic fluid through the flow passage 172 to the retraction chamber 162 to thereby retract the piston 152. The piezo-electro hydraulic servo valve 210 can then be closed.

As was described above with respect to the piezo-electro hydraulic servo valve 10, one or more strain gauges (not shown in FIG. 6) can be mounted to the piezo-electric actuators 212, 412. The controller 142 can monitor the strain gauges and consequently the associated expansion and contraction motion of the piezo-electric actuators 212, 412, the associated positions of the flexible frames, and the associated orifice areas of the supply and return ports 300, 310, 500, 510. This allows position feedback, removing hysteresis of the piezo system and improving position accuracy, as will be appreciated. The controller 142 and strain gauges thus can enable closed-loop control of the orifice areas. This allows more precise control of the flow rate by overcoming disturbances such as manufacturing tolerances, flow forces, and temperature effects. This also nullifies effects such as stack hysteresis and threshold, as well as similar effects in the piezo-driver electronics. Further, fitting multiple strain gauges on a single piezo-electric actuator 212, 412 can provide multiple parallel channels for actively controlling the piezo-electric actuator 212, 412. The controller 142 can use the multiple channels as redundant feedback and/or separate paths of feedback to more flexibly control the piezo-electric actuator. Should one channel fail, the controller 142 can maintain control with the other channel. As will be appreciated, the separate channels can provide feedback about the same characteristic of the actuator or different characteristics of the actuator.

The controller 142 can be used to control the position of the piezo stack 30 output and accordingly the piezo-electro hydraulic servo valves 210, 410 and the associated orifice areas of the ports 300, 310, 500, 510 by closed-loop control, open loop control, or any other suitable control means. The controller 142 can utilize look-up tables or control algorithms of required or desirable characteristics. For example, if a nonlinear position versus orifice area is desired, then a reverse look-up table of this characteristic can be included in the controller 142 so that flow velocity commands coming to the piezo-electro hydraulic servo valves 210, 410 appear to be linear to the outer hydraulic position loop. Alternatively, it may be desirable to have a highly nonlinear flow characteristic so that, for example, valve response is small for relatively small errors and large for relatively large errors.

In an embodiment, the controller 142 can monitor the relationship between the piezo voltages and the position of the piezo stacks as measured by the one or more strain gauges. When a piezo stack stops expanding/contracting despite voltage being applied, this may be an indication of a collision between a valve stem and a supply port 300, 500 or return port 310, 510, or an indication of wear in the piezo stacks, the valve stems, the ports 300, 310, 500, 510, or other component of the control assembly 140. The controller 142 may determine that an end stop or other problem has been encountered, and in the case of an end stop for example place a saturation limit where the end stop occurred to reduce the force of collisions. Alternatively, the sealing surfaces may be coated with a collision resistant material like rubber or o-rings. This may also have the advantage of improving sealing at null flow.

The piezo-electro hydraulic servo valves 210, 410 may also be configured with a fail-safe mode. For example, when electrical power is lost to a piezo-electro hydraulic servo valve 210, 410, the piezo stack of the piezo-electric actuator 210, 212 will contract and return to minimum length, which causes the valve stems to move away from the piezo stack axis A, or axis AA as the case may be, and close the respective supply port 300, 500 and return port 310, 510.

The controller 142 is configured to control the different piezo-electro hydraulic servo valves 210, 410 to extend and retract the piston 152 and to control lap characteristics. That is to say, the controller 142 can selectively control the piezo-electro hydraulic servo valve 210 to extend the piston 152 and selectively control the piezo-electro hydraulic servo valve 410 to retract the piston 152. In an embodiment, the controller 142 can be operative to open the first piezo-electro hydraulic servo valve 210 to communicate hydraulic fluid to the extension chamber 160 on one side of the piston 152 in the piston cylinder assembly 150 and away from the retraction chamber 162 on the other side of the piston 152 in the piston cylinder assembly 150 to extend the piston 152 in the rightward direction in FIG. 6. The controller 142 can further be operative to open the piezo-electro hydraulic servo valve 410 to communicate hydraulic fluid to the retraction chamber 162 and away from the extension chamber 160 to retract the piston 152 in the leftward direction in FIG. 6, that is, opposite the direction of extension of the piston 152.

In the FIG. 6 control assembly 140, different piezo-electric actuators 212, 412 are actuated for the extend and retract directions. Of course, the control assembly 140 need not be limited in such manner. For example, the control assembly 140 may incorporate additional piezo-electro hydraulic servo valves that control hydraulic fluid at different pressures in the extension chamber 160 and retraction chamber 162 on opposite sides of the piston 152. Any number of piezo-electro hydraulic servo valves are envisioned to control the rate and pressure of hydraulic fluid entering and exiting the extension chamber 160 and retraction chamber 162 to yield the desired movement in the drive member or other load, here a piston 152 of a hydraulic double acting piston cylinder.

In an embodiment, the controller 142 can control the piezo-electro hydraulic servo valves 210, 410 to control the width of the dead-zone between extend and retract. For example, the controller 142 can be configured to open the second piezo-electro hydraulic servo valve 410 before closing the first piezo-electro hydraulic servo valve 210 to yield an underlap condition. In another example, the controller 142 can add a delay between the close of the first piezo-electro hydraulic servo valve 210 and the opening of the second piezo-electro hydraulic servo valve 410 to yield an overlap condition, for example, when in certain applications it is desirable to reduce force fight and/or reduce limit cycling, and/or reduce sensitivity to disturbances. The control assembly 140 can switch to overlap mode while idle to improve stability, for example, if the system has been tuned with high gains. The control assembly 140 can then switch to underlap mode, for example, when in certain applications higher performance is being demanded, for example, when it is desirable to have increased sensitivity around the null position, and/or to increase the bandwidth, and/or to increase sensitivity to disturbances.

Figure 7:
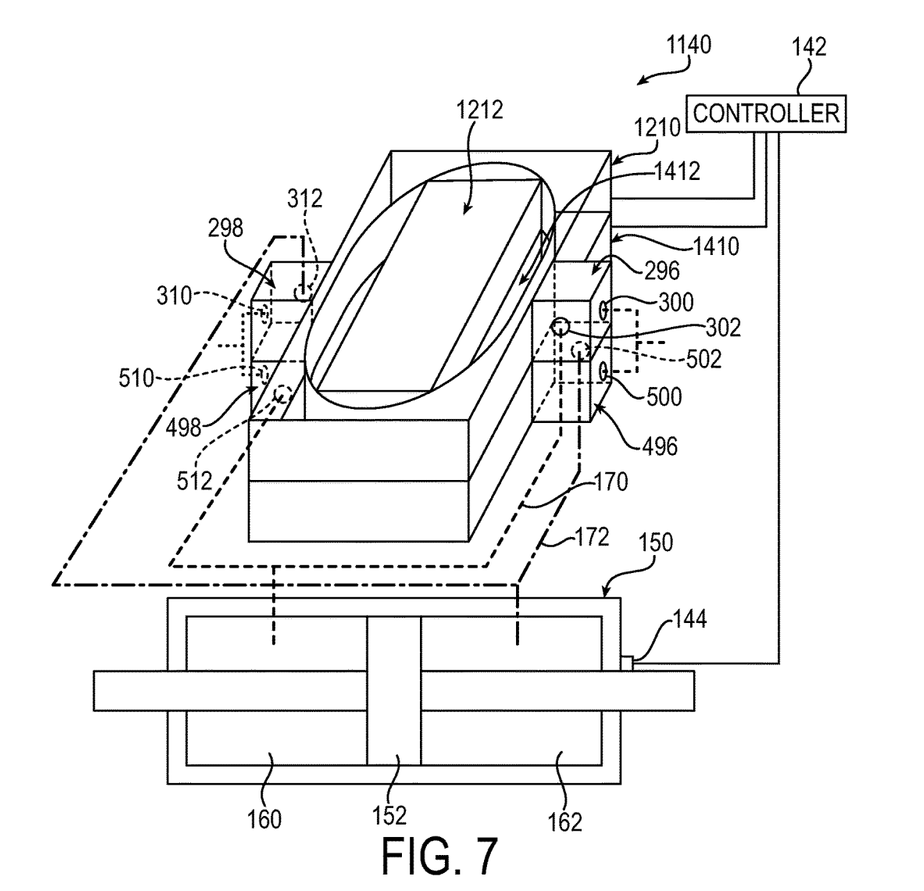
FIG. 7 is a perspective view of a control assembly according to another embodiment.

Referring now to FIG. 7, there is shown another embodiment of a control assembly 1140 for controlling a double acting piston cylinder. The control assembly 1140 includes a controller 142, first and second, or upper and lower, hydraulic servo valves 1210, 1410 and a piston cylinder assembly 150. Apart from the differences in the driving or actuation mechanisms of the servo valves 210, 410 and the servo valves 1210, 1410, the control assembly 1140 of FIG. 7 is in many respects substantially the same as the above-referenced control assembly 140 of FIG. 6, and consequently the same reference numerals are used to denote structures corresponding to similar structures in the control assembly 1140 of FIG. 7. In addition, the foregoing description of the FIG. 6 control assembly 140 is equally applicable to the FIG. 7 control assembly 1140, except as may be noted herein. Moreover, it will be appreciated upon reading and understanding the specification that aspects of the control assemblies 140, 1140 may be substituted for one another or used in conjunction with one another where applicable.

The first, or upper, hydraulic servo valve 1210 includes a first electro-mechanical driving mechanism or actuator 1212, and first and second chambers 296, 298 at laterally opposite sides of the first actuator 1212. The first chamber 296 has a supply port 300 and a first work port 302 and the second chamber 298 has a return port 310 and a second work port 312. The first actuator 1212 is electrically actuatable along an actuation axis to open and close the supply and return ports 300, 310 to control fluid communication with the respective first and second work ports 302, 312 of the respective first and second chambers 296, 298. The second, or lower, hydraulic servo valve 1410 includes a second electro-mechanical driving mechanism or actuator 1412, and third and fourth chambers 496, 498 at laterally opposite sides of the second actuator 1412. The third chamber 496 has a supply port 500 and a third work port 502 and the fourth chamber 498 has a return port 510 and a fourth work port 512. The second actuator 1412 is electrically actuatable along a second actuation axis to open and close the supply and return ports 500, 510 to control fluid communication with the respective third and fourth work ports 502, 512 of the respective third and fourth chambers 496, 498.

The first and second actuators 1212, 1412 can include any type of electro-mechanical device having one or more of a motor, solenoid, gear, spring, flapper, spool, linkage, lever, piezo stack or amplification frame. The first actuator 1212 is configured, upon actuation, to cause simultaneous opening and closing of the supply port 300 of the first chamber 296 and the return port 310 of the second chamber 298. The manner of actuation may be by either symmetric deformation or via motion along opposite sides of the center of the first actuator 1212. The second actuator 1412 is configured, upon actuation, to cause simultaneous opening and closing of the supply port 500 of the third chamber 496 and the return port 510 of the fourth chamber 498. Likewise, the manner of actuation may be by either symmetric deformation or via motion along opposite sides of the center of the second actuator 1412. As with the first and second actuators 212, 412, the first and second actuators 1212, 1412 each incorporate a symmetric two-way valve structure that enables the control valves (see FIGS. 1 and 2, control valves 26, 28) of each two-way valve 1212, 1412 to move together on opposite sides of the actuator 1212, 1412. Thus, for example, activation of the actuator 1212 (or actuator 1412), results in a displacement of the valve stem 36 (see FIGS. 1 and 2) on one side of the actuator 1212 being the same as a displacement of the valve stem 38 (see FIGS. 1 and 2) on the other side of the actuator 1212. Those skilled in the art will appreciate that numerous types of actuating mechanisms can realize the opening and closing of the supply port 300 and return port 310, or the supply port 500 or return port 510, for example, as by urging movement of the valve stems 36, 38 (see FIGS. 1 and 2) of the servo valves 1210, 1410. It will also be appreciated that the actuation axis of the first and second actuators 1212, 1412, may be transverse to the axis of deformation or motion, such as in the above-described piezo-electro actuators 12 (i.e. axis A is transverse to axis B in FIGS. 1 and 2) or actuators 212, 412, or may be parallel to or coaxial with the axis of deformation or motion, such as may be the case with a two-stage nozzle-flapper servo valve, for example.

Of course, as with the piezo-electro actuators 12, 212, 412, the first and second actuators 1212, 1412 can be configured for other than symmetric actuation on opposite sides of the actuators 1212, 1412, or other than simultaneous opening and closing of the hydraulic servo valves 1210, 1410. For example, the actuator 1212 (or actuator 1412) may incorporate an asymmetric two-way valve structure such that the resulting displacement of the valve stem 36 is different from the displacement of valve stem 38. Further, in an embodiment the actuator 1212 (or actuator 1412) may be coupled to the valve stems 36, 38 to yield a non-simultaneous motion between the valve stems 36, 38. For example, a clearance or neutral zone may be provided between the actuator 1212 and one of the valve stems 36, 38 so that motion transferred from the actuator 1212 to one valve stem 36, 38 is delayed relative to motion transferred to the other valve stem 36, 38.

The controller 142 is configured to activate and deactivate the first and second actuators 1212, 1412. The term "controller" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

When the controller 142 activates the first actuator 1212, the first actuator 1212 opens the supply port 300 of the first chamber 296 and the return port 310 of the second chamber 298. When the controller 142 deactivates the first actuator 1212, the first actuator 1212 closes the supply port 300 of the first chamber 296 and the return port 310 of the second chamber 298. When the controller 142 activates the second actuator 1412, the second actuator 1412 opens the supply port 500 of the third chamber 496 and the return port 510 of the fourth chamber 498. When the controller 142 deactivates the second actuator 1412, the second actuator 1412 closes the supply port 500 of the third chamber 496 and the return port 510 of the fourth chamber 498.

The piston cylinder assembly 150 includes a reciprocating piston 152 within a piston chamber 154 having an extension chamber 160 at one end of the piston 152 and a retraction chamber 162 at the other end of the piston 152. The extension chamber 160 is fluidly connected via a suitable flow passage 170 to the work port 302 of the first chamber 296 and the work port 512 of the fourth chamber 498. The retraction chamber 162 is fluidly connected via a suitable flow passage 172 to the work port 502 of the third chamber 496 and the work port 312 of the second chamber 298. As will be appreciated, the first and second work ports 302, 312 can operate as respective extend and retract ports 302, 312 for the first, or upper, hydraulic servo valve 1210, and the first and second work ports 502, 512 can operate as respective retract and extend ports 502, 512 for the second, or lower, hydraulic servo valve 1410.

In the FIG. 7 embodiment, the controller 142 may actuate the first and second hydraulic servo valves 1210, 1410 to extend the piston 152 (to the right in FIG. 7) or retract the position (to the left in FIG. 7). To extend the piston 152, the controller 142 activates the first actuator 1212 to open the control valves of the first and second chambers 296, 298 at opposite sides of the center of the first actuator 1212, for example, in the manner described above by urging movement of the valve stems 36, 38 (see FIGS. 1 and 2) of the control valves of the first servo valve 1210, or in a manner analogous to that described above with respect to the embodiment of FIGS. 1 and 2 or the embodiment of FIG. 6. With the control valve to the right in FIG. 7 open, the first chamber 296 communicates hydraulic fluid from the supply port 300 to the work port 302. The flow passage 170, in turn, communicates the hydraulic fluid from the work port 302 to the extension chamber 160 of the piston cylinder assembly 150. The hydraulic fluid in the extension chamber 160 increases the force exerted on the left side of the piston 152 to thereby extend the piston 152 toward the right in FIG. 7. Meanwhile, with the control valve to the left in FIG. 7 open, the flow passage 172 communicates hydraulic fluid away from the retraction chamber 162 of the piston cylinder assembly 150 to the work port 312 of the second chamber 298, which, in turn, communicates the hydraulic fluid from the work port 312 to the return port 310. The hydraulic fluid in the retraction chamber 162 lowers the force exerted on the right side of the piston 152, which aids extension of the piston 152 to the right in FIG. 7 by the hydraulic fluid in the extension chamber 160. The work port 310, in turn, communicates the hydraulic fluid from the second chamber 298 to a supply reservoir or the like. During the foregoing operation of extending the piston 152 from left to right in FIG. 7, the controller 142 may activate or deactivate the second hydraulic servo valve 1410, so long as the force exerted on the right side of the piston 152 is relatively lower than the force exerted on the left side of the piston 152 to urge the piston 152 from left to right.

To retract the piston 152, the controller 142 activates the second, or lower, actuator 1412 to open the control valves of the third and fourth chambers 496, 498 at opposite sides of the center of the second actuator 1412, for example, in the manner described above by urging movement of the valve stems 36, 38 (see FIGS. 1 and 2) of the control valves of the second servo valve 1410, or in a manner analogous to that described above with respect to the embodiment of FIGS. 1 and 2 or the embodiment of FIG. 6. With the control valve to the right in FIG. 7 open, the third chamber 496 communicates hydraulic fluid from the supply port 500 to the work port 502. The flow passage 172, in turn, communicates the hydraulic fluid from the work port 502 to the retraction chamber 162 of the piston cylinder assembly 150. The hydraulic fluid in the retraction chamber 162 increases the force exerted on the right side of the piston 152 to thereby retract the piston 152 toward the left in FIG. 7. Meanwhile, with the control valve to the left in FIG. 7 open, the flow passage 170 communicates hydraulic fluid away from the extension chamber 160 of the piston cylinder assembly 150 to the work port 512 of the fourth chamber 498, which, in turn, communicates the hydraulic fluid from the work port 512 to the return port 510. The hydraulic fluid in the extension chamber 160 lowers the force exerted on the left side of the piston 152, which aids retraction of the piston 152 to the left in FIG. 7 by the hydraulic fluid in the extension chamber 162. The work port 510, in turn, communicates the hydraulic fluid from the fourth chamber 498 to a supply reservoir or the like. During the foregoing operation of retracting the piston 152 from right to left in FIG. 7, the controller 142 may activate or deactivate the first hydraulic servo valve 1210, so long as the force exerted on the left side of the piston 152 is relatively lower than the force exerted on the right side of the piston 152 to urge the piston from right to left.

In the FIG. 7 embodiment, when the control assembly 140 opens the hydraulic servo valve 1210 the pressure of the hydraulic fluid communicated from the supply port 300 of the first chamber 296 to the extension chamber 160 is relatively higher than the pressure of the hydraulic fluid communicated from the retraction chamber 162 to the return port 310 of the return chamber 298. Similarly, when the control assembly 140 opens the hydraulic servo valve 1410 the pressure of the hydraulic fluid communicated from the supply port 500 of the first chamber 496 to the retraction chamber 162 is relatively higher than the pressure of the hydraulic fluid communicated from the extension chamber 160 to the return port 510 of the return chamber 498. Thus, the return ports 310, 510 of the return chambers 298, 498 operate as low pressure drains. As is also shown in FIG. 7, the supply ports 300, 500 branch from a common supply line, and the return ports 310, 510 feed into a common drain line. Further, in the FIG. 7 embodiment, the opposite sides of the piston 152 have the same effective working area.

As will be appreciated, the control assembly 140 need not be limited to the configuration shown in FIG. 7. For instance, the effective working areas may be different on opposite sides of the piston 152, and the hydraulic pressure at the supply ports 300, 500 may be relatively lower than the hydraulic pressure at the respective return ports 310, 510. Further, the supply ports 300, 500 need not share a common supply and can be configured to operate at hydraulic pressures independent of one another. Likewise, the return ports 310, 510 need not share a common drain and can be configured to operate at hydraulic pressures independent of one another. The controller 142 can be configured to control the hydraulic servo valves 1210, 1410 in conjunction with control of hydraulic pressure. Thus, the controller 142 can be configured to control the hydraulic servo valve 1210 separately and independently of the hydraulic servo valve 1410, for example, with respect to adjusting the orifice areas at the supply ports 300, 500 and return ports 310, 510, and the rate at which the orifice areas are adjusted. The controller 142 can also be configured to selectively increase and decrease the hydraulic pressure from the supply port 300 to the extension chamber 160 and from the retraction chamber 162 to the return port 310 and, independently thereof, selectively increase and decrease the hydraulic pressure from the supply port 500 to the retraction chamber 162 and from the extension chamber 160 to the return port 510. In some applications, the piston 152 may be spring loaded to bias the piston 152 toward either the extension side or the retraction side. In some applications, the control assembly 140 may incorporate a single acting spring loaded piston type actuating cylinder rather than the as-shown double acting piston cylinder. In still other applications, a two-way valve (rather than the as shown four-way valve of FIG. 7) can be used in such single acting spring loaded piston type actuating cylinder. Of course, it will be appreciated that a two-way valve can be used to drive a variety of loads including a hydraulic pump, a single acting piston, among others. In the FIG. 7 embodiment, or any other piston driven application, the controller 142 can also receive a piston position measurement or other data, for example via a suitable sensor 144 such as an LVDT, and use such information to control one or more of the hydraulic servo valves.

It will further be appreciated that a single hydraulic servo valve 1210 can be used as a gate valve to operate the double acting piston cylinder assembly 150 in FIG. 7. For example, the lower hydraulic servo valve 1410 can be omitted and the upper hydraulic servo valve 1210 can have its supply port 300 connected to a first hydraulic pressure controller and its return port 310 connected to a separate second hydraulic pressure controller. The first work port 302 can communicate hydraulic fluid to and from the extension chamber 160 via the flow passage 170 and the second work port 312 can communicate hydraulic fluid to and from the retraction chamber 162 via the flow passage 172. The portions of the flow passages 170, 172 routed to the lower hydraulic servo valve 1410 can be omitted. In operation, the pressure controllers generate relatively higher pressure on the left side (or right side) to effect a pressure drop across the hydraulic servo valve 1210. To extend the piston 152, the pressure controllers create a relatively higher pressure on the right side, that is, at the first chamber 296. The hydraulic servo valve 1210 can then be opened to allow flow of hydraulic fluid through the flow passage 170 to the extension chamber 160 to thereby extend the piston 152. The hydraulic servo valve 1210 can then be closed. To retract the piston 152, the pressure controllers create relatively higher pressure on the left side, that is, at the second chamber 298. The hydraulic servo valve 1210 can then be opened to allow flow of hydraulic fluid through the flow passage 172 to the retraction chamber 162 to thereby retract the piston 152. The hydraulic servo valve 1210 can then be closed.

As was described above with respect to the piezo-electro hydraulic servo valve 10, one or more strain gauges (not shown in FIG. 7) can be mounted to the actuators 1212, 1412. The controller 142 can monitor the strain gauges and consequently the associated expansion, contraction or other actuation motion of the actuators 1212, 1412, the associated positions of the actuator components such as the motor, solenoid, gear, spring, flapper, spool, linkage, lever, piezo stack or amplification frame, and the associated orifice areas of the supply and return ports 300, 310, 500, 510. This allows position feedback, removing hysteresis of the electro-mechanical actuation system and improving position accuracy, as will be appreciated. The controller 142 and strain gauges thus can enable closed-loop control of the orifice areas. This allows more precise control of the flow rate by overcoming disturbances such as manufacturing tolerances, flow forces, and temperature effects. This also nullifies effects such as stack hysteresis and threshold, as well as similar effects in the electro-mechanical driver electronics. Further, fitting multiple strain gauges on a single actuator 1212, 1412 can provide multiple parallel channels for actively controlling the actuator 1212, 1412. The controller 142 can use the multiple channels as redundant feedback and/or separate paths of feedback to more flexibly control the actuator. Should one channel fail, the controller 142 can maintain control with the other channel. As will be appreciated, the separate channels can provide feedback about the same characteristic of the actuator or different characteristics of the actuator.

The controller 142 can be used to control the position of the actuator 1212, 1412 output and accordingly the hydraulic servo valves 1210, 1410 and the associated orifice areas of the ports 300, 310, 500, 510 by closed-loop control, open loop control, or any other suitable control means. The controller 142 can utilize look-up tables or control algorithms of required or desirable characteristics. For example, if a nonlinear position versus orifice area is desired, then a reverse look-up table of this characteristic can be included in the controller 142 so that flow velocity commands coming to the hydraulic servo valves 1210, 1410 appear to be linear to the outer hydraulic position loop. Alternatively, it may be desirable to have a highly nonlinear flow characteristic so that, for example, valve response is small for relatively small errors and large for relatively large errors.

In an embodiment, the controller 142 can monitor the relationship between the actuator 1212, 1412 voltages and the position of the actuators 1212, 1412 as measured by the one or more strain gauges. When an actuator 1212, 1412 stops expanding, contracting, or otherwise yielding an actuation motion, despite voltage being applied, this may be an indication of a collision between a valve stem and a supply port 300, 500 or return port 310, 510, or an indication of wear in the components of the actuators 1212, 1412, the valve stems, the ports 300, 310, 500, 510, or other component of the control assembly 140. The controller 142 may determine that an end stop or other problem has been encountered, and in the case of an end stop for example place a saturation limit where the end stop occurred to reduce the force of collisions. Alternatively, the sealing surfaces may be coated with a collision resistant material like rubber or o-rings. This may also have the advantage of improving sealing at null flow.

The hydraulic servo valves 1210, 1410 may also be configured with a fail-safe mode. For example, when electrical power is lost to a hydraulic servo valve 1210, 1410, the actuators 1210, 1212 will return to their deactivated states, which causes the valve stems to move away from the center of the actuators 1210, 1410 as the case may be, and close the respective supply port 300, 500 and return port 310, 510.

The controller 142 is configured to control the different hydraulic servo valves 1210, 1410 to extend and retract the piston 152 and to control lap characteristics. That is to say, the controller 142 can selectively control the hydraulic servo valve 1210 to extend the piston 152 and selectively control the hydraulic servo valve 1410 to retract the piston 152. In an embodiment, the controller 142 can be operative to open the first hydraulic servo valve 1210 to communicate hydraulic fluid to the extension chamber 160 on one side of the piston 152 in the piston cylinder assembly 150 and away from the retraction chamber 162 on the other side of the piston 152 in the piston cylinder assembly 150 to extend the piston 152 in the rightward direction in FIG. 7. The controller 142 can further be operative to open the hydraulic servo valve 1410 to communicate hydraulic fluid to the retraction chamber 162 and away from the extension chamber 160 to retract the piston 152 in the leftward direction in FIG. 7, that is, opposite the direction of extension of the piston 152.

In the FIG. 7 control assembly 140, different actuators 1212, 1412 are actuated for the extend and retract directions. Of course, the control assembly 140 need not be limited in such manner. For example, the control assembly 140 may incorporate additional hydraulic servo valves that control hydraulic fluid at different pressures in the extension chamber 160 and retraction chamber 162 on opposite sides of the piston 152. Any number of hydraulic servo valves are envisioned to control the rate and pressure of hydraulic fluid entering and exiting the extension chamber 160 and retraction chamber 162 to yield the desired movement in the drive member or other load, here a piston 152 of a hydraulic double acting piston cylinder.

In an embodiment, the controller 142 can control the hydraulic servo valves 1210, 1410 to control the width of the dead-zone between extend and retract. For example, the controller 142 can be configured to open the second hydraulic servo valve 1410 before closing the first hydraulic servo valve 1210 to yield an underlap condition. In another example, the controller 142 can add a delay between the close of the first hydraulic servo valve 1210 and the opening of the second hydraulic servo valve 1410 to yield an overlap condition, for example, when in certain applications it is desirable to reduce force fight and/or reduce limit cycling, and/or reduce sensitivity to disturbances. The control assembly 140 can switch to overlap mode while idle to improve stability, for example, if the system has been tuned with high gains. The control assembly 140 can then switch to underlap mode, for example, when in certain applications higher performance is being demanded, for example, when it is desirable to have increased sensitivity around the null position, and/or to increase the bandwidth, and/or to increase sensitivity to disturbances.

FIGS. 6 and 7 disclose different embodiments of a control assembly 140 that embodies an arrangement of a valving system that allows adjustable overlap, inside of which a piezo-electro hydraulic servo valve (FIG. 6), or any other suitable hydraulic servo valve (FIG. 7), can be placed. The valving arrangement includes an upper two-way hydraulic servo valve (210 in FIG. 6, and 1210 in FIG. 7) and a lower two-way hydraulic servo valve (410 in FIG. 6, and 1410 in FIG. 7), which together form a four-way hydraulic servo valve that enables the adjustable overlap. In the FIGS. 6 and 7 embodiments, two of the four valve paths are mechanically connected to each other to ensure they will always move together. In FIG. 6, the first and second hydraulic servo valves 210, 410 include respectively first and second two-way valves, wherein opening the first two-way valve 210 opens the first work port 302 to communicate fluid to the extension chamber 160 via the flow path 170 while opening the second work port 312 to communicate fluid away from the retraction chamber 162 via the flow path 172, and wherein opening the second two-way valve 410 opens the third work port 502 to communicate fluid to the retraction chamber 162 via the flow path 172 while opening the fourth work port 512 to communicate fluid away from the retraction chamber 162 via the flow path 170. In FIG. 7, the first and second hydraulic servo valves 1210, 1410 include respectively first and second two-way valves, wherein opening the first two-way valve 1210 opens the first work port 302 to communicate fluid to the extension chamber 160 via the flow path 170 while opening the second work port 312 to communicate fluid away from the retraction chamber 162 via the flow path 172, and wherein opening the second two-way valve 1410 opens the third work port 502 to communicate fluid to the retraction chamber 162 via the flow path 172 while opening the fourth work port 512 to communicate fluid away from the retraction chamber 162 via the flow path 170. It will be appreciated, of course, that four one-way hydraulic servo valves could also form the four-way hydraulic servo valve, which, as with the two-way valves described above, could be programmed to allow adjustable overlap.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A servo valve, comprising:
a piezo-electric actuator actuatable along a piezo stack axis;
a flexible linkage coupled to the piezo-electric actuator at opposite axial ends of the actuator; and
control valves disposed at laterally opposite sides of the piezo stack axis including respective valve stems coupled to the flexible linkage;
wherein the flexible linkage is configured to transfer motion of the piezo-electric actuator along the piezo stack axis to a motion of the valve stems along an amplification axis that is transverse to the piezo stack axis to open and close the control valves.

2. The servo valve of claim 1, wherein the flexible linkage is symmetric about the piezo stack axis.

3. The servo valve of claim 1, wherein the flexible linkage is configured to transfer motion to the valve stems simultaneously.

4. The servo valve of claim 1, wherein the flexible linkage transfers expansion and contraction motion of the piezo-electric actuator to motion of the valve stems respectively toward and away from the actuator.

5. The servo valve of claim 4, further comprising a strain gauge mounted to the piezo-electric actuator to measure expansion and contraction motion of the piezo-electric actuator and the corresponding movement of the valve stems toward and away from the actuator.

6. The servo valve of claim 1, further comprising a valve housing including piezo-electric actuator sliding supports at opposite axial ends of the piezo-electric actuator to guide movement of the piezo-electric actuator along the piezo stack axis.

7. The servo valve of claim 1, further comprising a valve housing including a valve stem sliding support to guide movement of the valve stems along the amplification axis.

8. The servo valve of claim 1, wherein the control valves at laterally opposite sides of the piezo stack axis include respectively a source chamber and a return chamber, wherein the source chamber has a supply port and a first work port, and the return chamber has a return port and a second work port, and wherein, in response to movement of the valve stems along the amplification axis, the valve stem of the control valve having the source chamber is configured to permit or block passage of hydraulic fluid from the supply port to the first work port and the valve stem of the control valve having the return chamber is configured to permit or block passage of hydraulic fluid from the second work port to the return port.

9. The servo valve of claim 8, wherein the valve stems are configured to meter flow through the respective supply port of the source chamber and the return port of the return chamber.

10. The servo valve of claim 9, wherein the flexible linkage transfers motion to the valve stems so that the valve stems meter flow through the supply port and return port at the same time.

11. The servo valve of claim 8, wherein the valve stem and supply port and the valve stem and the return port each form a poppet valve.

12. The servo valve of claim 8, wherein the valve stem and supply port and the valve stem and the return port each form a linear valve.

13. A servo valve, comprising:
a first symmetric actuation element;
first and second chambers at laterally opposite sides of the first symmetric actuation element, the first chamber having a supply port and a first work port and the second chamber having a return port and a second work port;
wherein the first symmetric actuation element is electrically actuatable along an actuation axis to open and close the supply and return ports to control fluid communication with the respective first and second work ports of the respective first and second chambers.

14. The servo valve of claim 13, wherein the first symmetric actuation element is configured to open the first chamber supply port and the second chamber return port when activated and to close the first chamber supply port and the second chamber return port when deactivated.

15. The servo valve of claim 13, wherein the first symmetric actuation element includes a piezo stack encompassed by an external, flexible frame, wherein movement of the piezo stack causes the flexible frame to mechanically deform along opposite sides of the actuation axis and simultaneously open or close the first chamber supply port and the second chamber return port.

16. The servo valve of claim 15, wherein the actuation axis of the first symmetric actuation element is transverse to the axis of deformation of the flexible frame.

17. The servo valve of claim 13, wherein the first symmetric actuation element includes an electro-mechanical device having one or more of a motor, solenoid, gear, spring, flapper, spool, linkage, lever, piezo stack or amplification frame, wherein the electro-mechanical device is configured, upon actuation, to cause simultaneous opening and closing of the first chamber supply port and the second chamber return port via either symmetric deformation or via motion along opposite sides of the center of the electro-mechanical device.

18. The servo valve of claim 17, wherein the actuation axis of the first symmetric actuation element is parallel to or coaxial with the axis of deformation or motion of the electro-mechanical device.

19. The servo valve of claim 13, further comprising:
a second symmetric actuation element;
third and fourth chambers at laterally opposite sides of the second symmetric actuation element, the third chamber having a supply port and a third work port and the fourth chamber having a return port and a fourth work port;
wherein the second symmetric actuation element is electrically actuatable along a second actuation axis to open and close the supply and return ports to control fluid communication with the respective third and fourth work ports of the respective third and fourth chambers.

20. The servo valve of claim 19,
wherein the first symmetric actuation element is configured to open the first chamber supply port and the second chamber return port when activated and to close the first chamber supply port and the second chamber return port when deactivated,
wherein the second symmetric actuation element is configured to open the third chamber supply port and the fourth chamber return port when activated and to close the third chamber supply port and fourth chamber return port when deactivated.

21. A control assembly comprising the servo valve of claim 20, and a piston cylinder assembly including a reciprocating piston within a piston chamber having an extension chamber portion at one end of the piston fluidly connected to the first chamber work port and the fourth chamber work port, and a retraction chamber portion at another end of the piston fluidly connected to the third chamber work port and the second chamber work port, wherein when the first symmetric actuation element is activated fluid is directed to the extension chamber portion and away from the retraction chamber portion to extend the piston, and when the second symmetric actuation element is activated fluid is directed to the retraction chamber portion and away from the extension chamber portion to retract the piston.

22. The control assembly of claim 21, further comprising a manifold including flow passages for communicating fluid from the first and fourth chamber work ports to the extension chamber portion and from the third and second chamber ports to the retraction chamber portion.

23. A method of operating a piston cylinder assembly comprising:
using a first direction electro-mechanical device to opening a first hydraulic servo valve to mechanically open first and second control valves,
wherein the mechanically opening of the first control valve communicates hydraulic fluid to an extension chamber on one side of a piston in the piston cylinder assembly and
wherein the mechanically opening of the second control valve communicates hydraulic fluid away from a retraction chamber on an opposite side of the piston cylinder assembly to extend the piston in a first direction; and
using a second direction electro-mechanical device to open a second hydraulic servo valve to mechanically open third and fourth control valves,
wherein the mechanically opening of the third control valve communicates hydraulic fluid to the retraction chamber on the opposite side of the piston in the piston cylinder assembly and
wherein the mechanically opening of the fourth control valve communicates hydraulic fluid away from the extension chamber on the one side of the piston in the piston cylinder assembly to retract the piston in a second direction that is opposite the first direction.

24. The method of claim 23, wherein the first direction electro-mechanical device and the second direction electro-mechanical device have one or more of a motor, solenoid, gear, spring, flapper, spool, linkage, lever, piezo stack or amplification frame.

25. The method of claim 23, wherein the first and second hydraulic servo valves include respectively first and second two-way valves, wherein opening the first two-way valve opens a first extend port to communicate fluid to the extension chamber via a first flow path while opening a first retract port to communicate fluid away from the retraction chamber via a second flow path, wherein opening the second two-way valve opens a second extend port to communicate fluid to the retraction chamber via the second flow path while opening a second retract port to communicate fluid away from the extension chamber via the first flow path.

26. A method of operating a piston cylinder assembly comprising:
opening a first hydraulic servo valve to communicate hydraulic fluid to an extension chamber on one side of a piston in the piston cylinder assembly and away from a retraction chamber on an opposite side of the piston cylinder assembly to extend the piston in a first direction; and
opening a second hydraulic servo valve to communicate hydraulic fluid to the retraction chamber on the opposite side of the piston in the piston cylinder assembly and away from the extension chamber on the one side of the piston in the piston cylinder assembly to retract the piston in a second direction that is opposite the first direction,
wherein the first and second hydraulic servo valves each include a piezo stack encompassed by an external flexible frame.

27. A method of operating a piston cylinder assembly comprising:
opening a first hydraulic servo valve to communicate hydraulic fluid to an extension chamber on one side of a piston in the piston cylinder assembly and away from a retraction chamber on an opposite side of the piston cylinder assembly to extend the piston in a first direction; and
opening a second hydraulic servo valve to communicate hydraulic fluid to the retraction chamber on the opposite side of the piston in the piston cylinder assembly and away from the extension chamber on the one side of the piston in the piston cylinder assembly to retract the piston in a second direction that is opposite the first direction,
wherein the second hydraulic servo valve is opened before the first hydraulic servo valve is closed to yield an underlap condition.

28. A method of operating a piston cylinder assembly comprising:
opening a first hydraulic servo valve to communicate hydraulic fluid to an extension chamber on one side of a piston in the piston cylinder assembly and away from a retraction chamber on an opposite side of the piston cylinder assembly to extend the piston in a first direction; and
opening a second hydraulic servo valve to communicate hydraulic fluid to the retraction chamber on the opposite side of the piston in the piston cylinder assembly and away from the extension chamber on the one side of the piston in the piston cylinder assembly to retract the piston in a second direction that is opposite the first direction,
further comprising waiting a predetermined amount of delay between closing of the first hydraulic servo valve and opening of the second hydraulic servo valve to yield an overlap condition.

* * * * *